US012143000B2

(12) United States Patent
Mohzani et al.

(10) Patent No.: US 12,143,000 B2
(45) Date of Patent: Nov. 12, 2024

(54) POWER CONVERTER AND METHOD FOR OPERATING A POWER CONVERTER

(71) Applicant: Robert Bosch GmbH, Stuttgart (DE)

(72) Inventors: Zaki Bin Mohzani, Stuttgart (DE); Jan Riedel, Esslingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 17/774,159

(22) PCT Filed: Sep. 25, 2020

(86) PCT No.: PCT/EP2020/076963
§ 371 (c)(1),
(2) Date: May 4, 2022

(87) PCT Pub. No.: WO2021/089239
PCT Pub. Date: May 14, 2021

(65) Prior Publication Data
US 2022/0407404 A1     Dec. 22, 2022

(30) Foreign Application Priority Data
Nov. 4, 2019   (DE) ............... 10 2019 216 911.2

(51) Int. Cl.
H02M 7/797   (2006.01)
H02M 1/00   (2006.01)

(52) U.S. Cl.
CPC ....... H02M 1/0058 (2021.05); H02M 1/0012 (2021.05); H02M 1/0043 (2021.05); H02M 1/007 (2021.05); H02M 7/797 (2013.01)

(58) Field of Classification Search
CPC .. H02M 1/0058; H02M 1/007; H02M 1/0043; H02M 1/0012; H02M 7/797; H02M 3/3384; Y02B 70/10
See application file for complete search history.

(56) References Cited

U.S. PATENT DOCUMENTS 9,444,355 B2 * 9/2016 Zimmanck .......... H02M 3/3353
10,050,534 B1 * 8/2018 Murthy-Bellur ..........................
                                                H02M 3/33584
(Continued)

FOREIGN PATENT DOCUMENTS

EP       3651331 A1   5/2020
WO    2019008854 A1   1/2019

OTHER PUBLICATIONS

Translation of International Search Report for Application No. PCT/EP2020/076963 dated Jan. 18, 2021 (2 pages).

*Primary Examiner* — Thienvu V Tran
*Assistant Examiner* — Yahveh Comas Torres
(74) *Attorney, Agent, or Firm* — Michael Best & Friedrich LLP (57) ABSTRACT

The invention relates to a power converter (300) which is designed to receive an input voltage (350) and output and output voltage (360). The power converter comprises multiple switches (371, . . . , 387). The power converter also comprises a control unit which is connected to the multiple switches, wherein the control unit is designed to control the multiple switches of the power converter based on data in a database using an input parameter or an output parameter. The invention also relates to a method for operating a power converter. The method comprises the step of controlling multiple switches of the power converter using a control unit, which is connected to the multiple switches, based on data in a database using an input parameter or an output parameter.

7 Claims, 4 Drawing Sheets

(56) References Cited

U.S. PATENT DOCUMENTS

| | | | |
|---|---|---|---|
| 2012/0294045 A1* | 11/2012 | Fornage | H02M 7/217 |
| | | | 363/17 |
| 2013/0308344 A1* | 11/2013 | Rosado | H02M 3/33584 |
| | | | 363/17 |
| 2014/0268897 A1* | 9/2014 | Zimmanck | H02M 3/33573 |
| | | | 363/17 |
| 2018/0034359 A1* | 2/2018 | Chen | H02M 3/33592 |
| 2018/0183345 A1* | 6/2018 | Itoh | H02M 3/33584 |
| 2020/0274457 A1* | 8/2020 | Kajiyama | H02M 3/335 |

* cited by examiner

POWER CONVERTER AND METHOD FOR OPERATING A POWER CONVERTER

BACKGROUND OF THE INVENTION

The present disclosure relates to a power converter and a method for operating a power converter.

Electric vehicles (EVs) use power converters such as DC/DC converters in order to transfer energy between a low voltage battery/low voltage grid and a battery with a higher voltage. These DC/DC converters are also used to charge the vehicle battery at the power grid. Because of the trend toward the electrification of vehicles, DC/DC converters that are not only able to transfer more power, but that can also do this with the same or even lower mechanical size, continue to be needed. The power density ($kW/m^3$) of the DC/DC converters must therefore be increased.

PSFB (phase-shifted full bridge) topologies or the DAB (dual-active bridge) topologies can be used to achieve a higher power density. These new topologies offer a higher power density by switching semiconductor switches on and off in such a way that the "switching losses" are reduced to zero. This technology is referred to as zero-voltage switching (ZVS).

As a result of variations in the construction of the DC/DC converter and/or of loads used in operation, ZVS cannot be guaranteed by existing PSFB/DAB embodiments during operation. Control loops and many sensors are thus used in the case of these existing converters in order to guarantee ZVS, which increases the costs of the converters.

PSFB-based or DAB-based embodiments are also not excluded from safety requirements such as protection against undervoltage, overvoltage, overcurrent, short-circuit and other unexpected events. These safety requirements require additional components (such as sensors) which can also increase the end costs of a product.

There is therefore a need to provide an improved power converter that can reduce the necessity for additional components as well as the manufacturing costs.

SUMMARY OF THE INVENTION

The present disclosure relates to a power converter. The power converter can be designed to receive an input voltage and to output an output voltage. The power converter can comprise multiple switches. The power converter can also comprise a control unit that is connected to the multiple switches, while the control unit is designed to control the multiple switches of the power converter on the basis of data in a database, using an input parameter or an output parameter of the power converter.

The present disclosure also relates to a method for operating a power converter. The method can comprise the control of multiple switches of the power converter using a control unit that is connected to the multiple switches on the basis of data in a database using an input parameter or an output parameter of the power converter.

BRIEF DESCRIPTION OF THE DRAWINGS

Various embodiments of the present disclosure are described with reference to the following drawings in the description below, wherein.

DETAILED DESCRIPTION

The following detailed description describes particular details and embodiments with which the invention can be practiced. These embodiments are described in sufficient detail to enable experts to implement the invention. Other embodiments can be used, and modifications made, without deviating from the protective scope of the invention. The various embodiments are not necessarily mutually exclusive, since some embodiments can be combined with one or multiple embodiments to form new embodiments.

Features that are described in connection with one embodiment can accordingly be applicable to the same or similar features in the other embodiments. Features that are described in connection with one embodiment can accordingly be applicable to other embodiments even if this is not explicitly described in these other embodiments. In addition, supplements and/or combinations and/or alternatives, as they are described for one feature in connection with one embodiment, can correspondingly be applicable to the same or a similar feature in the other embodiments.

The invention described illustratively here can appropriately be practiced without any element or any elements, any restriction or any restrictions that are not specifically disclosed here. The terms "including", "comprising", "containing" and so forth are thus to be understood comprehensively and without restriction. The word "include" or its modifications such as "includes" or "including" are accordingly to be understood in such a way that they refer to a given integral number or groups of integral numbers, but nevertheless do not imply the exclusion of any other integral number or group of integral numbers. The terms and expressions that are used here, moreover, are used as terms of the description and not of the restriction, and when such terms and expressions are used there is no intention to exclude any equivalents of the features indicated and described here or parts thereof; it is nevertheless recognized that various modifications are possible within the claimed scope of the invention. It should thus be obvious that although the present invention is particularly disclosed through exemplary embodiments and optional features, experts can make use of a modification and variant of the inventions disclosed and described here, and that such modifications and variants are to be deemed to lie within the scope of this invention.

Figure 1:
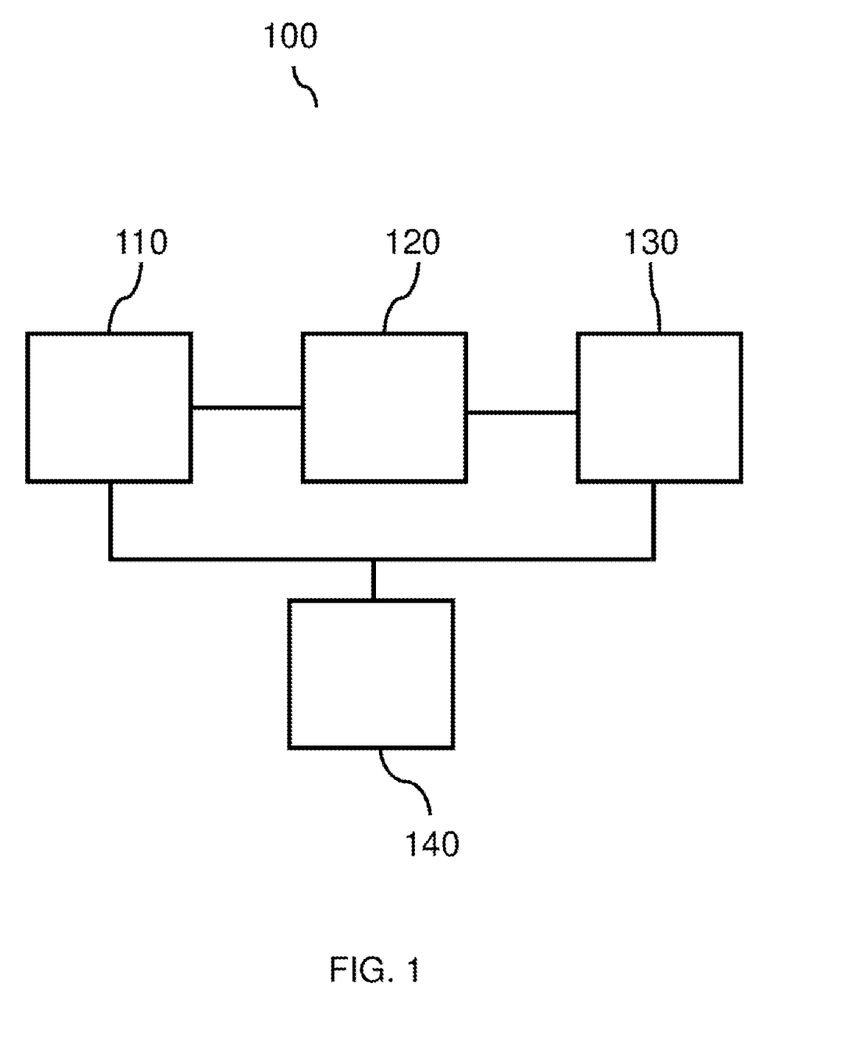
FIG. 1 illustrates a block diagram of a power converter 100 according to various embodiments.

FIG. 1 illustrates a block diagram of a power converter 100 according to various embodiments.

According to various embodiments, the power converter 100 can comprise a primary converter 110. In various embodiments, the power converter 100 can comprise an AC grid 120. In various embodiments, the power converter 100 can comprise a secondary converter 130. In various embodiments, the power converter 100 can comprise a control unit 140. For example the primary converter 110 can be a DC/AC converter, and the secondary converter 130 can be an AC/DC converter.

In some embodiments, the primary converter 110 can comprise multiple switches. In various embodiments, the multiple switches can be field effect transistors (FETs), for example metal oxide semiconductor field effect transistors (MOSFETs). In some embodiments the multiple switches can be insulated gate bipolar transistors (IGBTs).

In various embodiments, the AC grid 120 can be electrically connected to the primary converter 110.

In various embodiments, the secondary converter 130 can be electrically connected to the AC grid 120.

In various embodiments, the secondary converter 130 can comprise multiple switches. In various embodiments, the multiple switches can be field effect transistors (FETs), for example metal oxide semiconductor field effect transistors (MOSFETs). In some embodiments, the multiple switches can be insulated gate bipolar transistors (IGBTs).

In various embodiments the control unit 140 can be a wired logic circuit or a programmable logic circuit, such as a programmable processor. The control unit can also be a processor executing software, for example any type of computer program that is stored in a memory, firmware or some combination thereof.

In various embodiments, the control unit 140 can be connected to the multiple switches. In various embodiments, the multiple switches can be present in the primary converter 110 and/or the secondary converter 130.

In various embodiments, the control unit 140 can be designed to control the multiple switches of the power converter on the basis of data in a database, using an input parameter or an output parameter of the power converter 100. In various embodiments, the database can be a lookup table. The lookup table can be implemented as a read-only memory (ROM), electrically erasable programmable read-only memory (EEPROM), or some other appropriate device, for example programmatically.

In various embodiments, the AC grid 120 can comprise a transformer or be such a device. In various embodiments, the AC grid 120 can have a primary side and a secondary side. The primary side of the AC grid 120 can be electrically coupled to the primary converter 110. The secondary side of the AC grid 120 can be electrically coupled to the secondary converter 130.

In various embodiments, the power converter 100 can be a DC/DC converter. The DC/DC converter can be an electronic circuit that is able to receive a first DC voltage level at an input and to convert this into a second DC voltage level at an output, wherein the second voltage level can preferably differ from the first voltage level.

Figure 2:
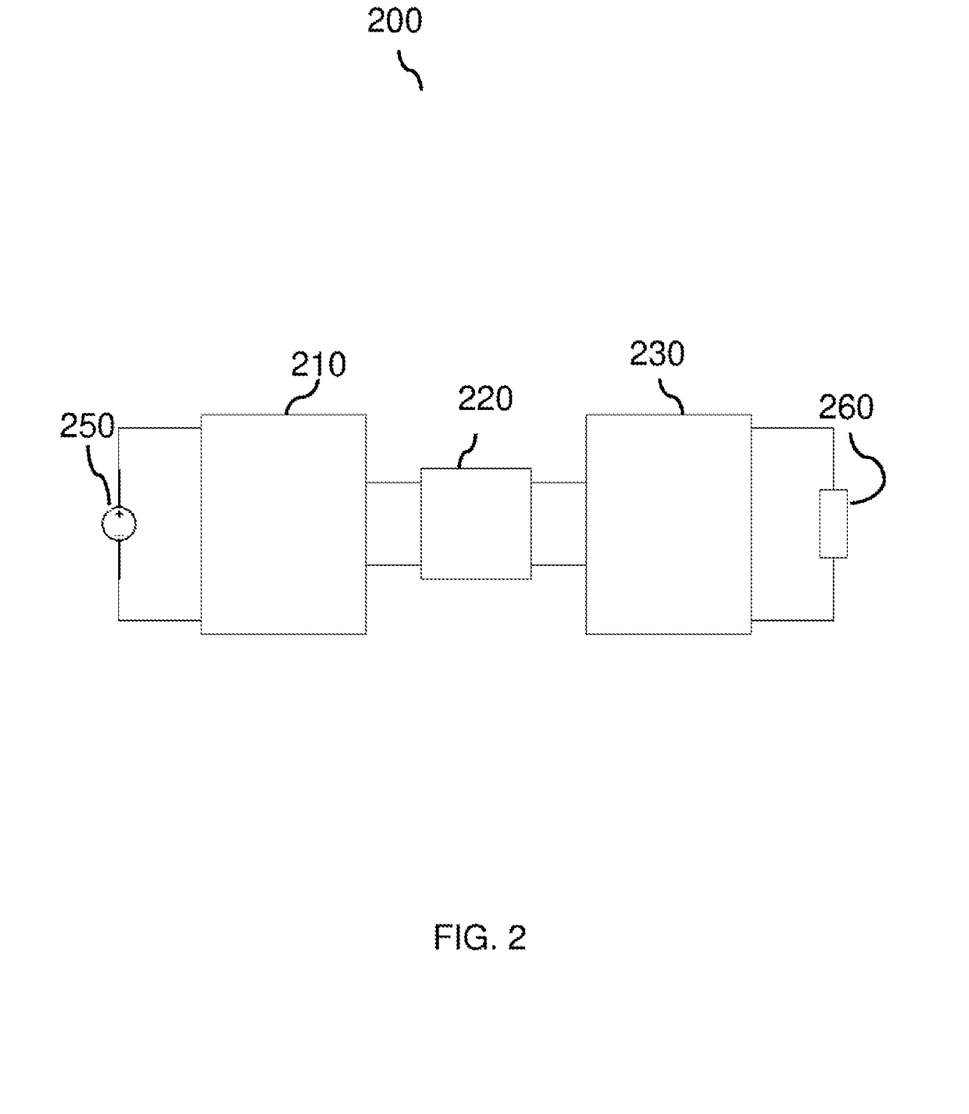
FIG. 2 illustrates a block diagram of a power converter 200 according to various embodiments.

FIG. 2 illustrates a block diagram of a power converter 200 according to various embodiments. The power converter 200 can comprise a primary converter 210. The power converter 200 can comprise an AC grid 220. The power converter 200 can comprise a secondary converter 230. The power converter 200 can also comprise a control unit (not illustrated).

In various embodiments, the primary converter 210 can be designed to receive an input voltage from a power source 250.

In various embodiments, the power source 250 can be a DC power source. The input voltage can be a DC voltage. The input voltage can lie between 250 V and 450 V.

In various embodiments, the secondary converter 230 can be designed to output an output voltage. The output voltage can be a DC voltage. The output voltage can lie below the input voltage. The output voltage can be between 20 V and 40 V.

In various embodiments, the secondary converter 230 can be connected to a load 260. For example the load 260 can be a DC load. In various embodiments, the secondary converter 230 can be designed to output the output voltage to the load 260.

The secondary converter 230 can alternatively be designed to receive an input voltage from a power source 250.

In various embodiments, the power source 250 can be a DC power source. The input voltage can be a DC voltage.

In various embodiments, the primary converter 210 can be designed to output an output voltage. The output voltage can be a DC voltage.

In various embodiments, the primary converter 210 can be connected to a load 260. The load 260 can, for example, be a DC load. In various embodiments, the primary converter 210 can be designed to output the output voltage to the load 260.

The power converter 200 can be a bidirectional converter; for example, in one operating mode, the secondary converter 230 can receive a DC voltage as input, a DC side (that is not connected to the AC grid 220) of the primary converter 210 can act as the output, and a circuit connected to the DC side of the primary converter 210 can act as the load. In another operating mode, the primary converter 210 can receive DC voltage as an input, a DC side (that is not connected to the AC grid 220) of the secondary converter 230 can act as the output, and a circuit connected to the DC side of the secondary converter 230 can act as the load. Although FIG. 2 is used as an example for the description of the bidirectionality of the converter, the disclosure is not restricted to that.

In various embodiments, the description of the power converter 100 also applies to the power converter 200.

Figure 3:
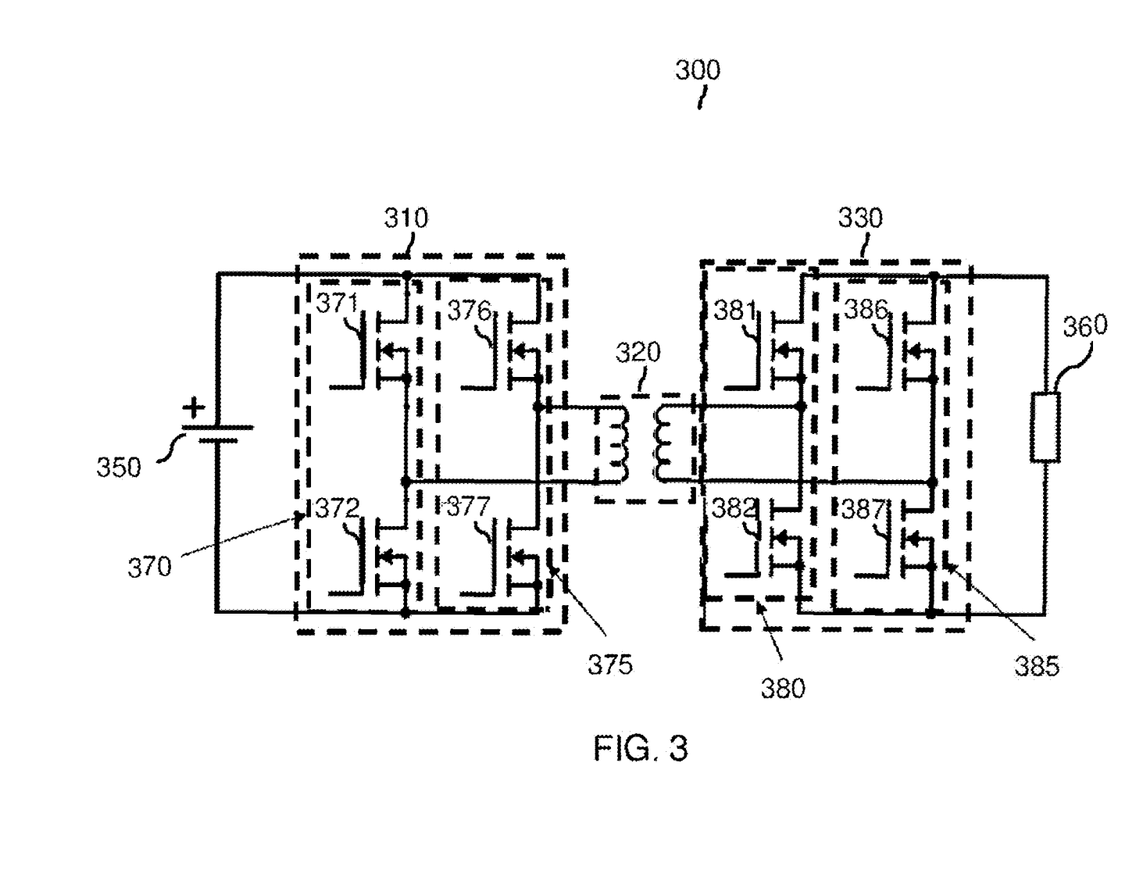
FIG. 3 illustrates an in-principle circuit diagram of a power converter 300 according to various embodiments.

FIG. 3 illustrates an in-principle circuit diagram of a power converter 300 according to various embodiments.

According to various embodiments, the power converter 300 can comprise a primary converter 310. The power converter 300 can comprise an AC grid 320. The power converter 300 can comprise a secondary converter 330. The power converter 300 can also comprise a control unit (not illustrated) that controls the switches. The control unit can be connected to the control terminal of the transistors (terminal not illustrated).

In various embodiments, the primary converter 310 can be designed to receive an input voltage from a power source 350. The power source 350 can be a DC power source. The input voltage can be a DC voltage.

In various embodiments, the secondary converter 330 can be designed to output an output voltage. The output voltage can be a DC voltage. The secondary converter 330 can be connected to a load 360. The load 360 can be a DC load. The secondary converter 330 can be designed to output the output voltage to the load 360.

Alternatively, the secondary converter 330 can be designed to receive an input voltage from a power source 350. The power source 350 can be a DC power source. The input voltage can be a DC voltage.

In various embodiments, the primary converter 310 can be designed to output an output voltage. The output voltage can be a DC voltage. The primary converter 310 can be connected to a load 360. The load 360 can be a DC load. The primary converter 310 can be designed to output the output voltage to the load 360.

In various embodiments, the primary converter 110 can comprise multiple switches. In some embodiments, the multiple switches can be field effect transistors (FETs), for example metal oxide semiconductor field effect transistors (MOSFETs). In some embodiments, the multiple switches can be insulated gate bipolar transistors (IGBTs).

In various embodiments, the secondary converter 330 can comprise multiple switches. In some embodiments, the multiple switches can be field effect transistors (FETs), for example metal oxide semiconductor field effect transistors (MOSFETs). In some embodiments, the multiple switches can be insulated gate bipolar transistors (IGBTs).

In various embodiments, the power converter 300 can be a dual-active bridge converter (dual-active bridge). The primary converter can be or comprise a first active bridge circuit. The secondary converter can be or comprise a second active bridge circuit.

In various embodiments, the power converter 300 can comprise a first pair of switches 371, 372 of the multiple switches, and a second pair of switches 376, 377 of the multiple switches. The first pair of switches 371, 372 and the second pair of switches 376, 377 can be connected in a first active bridge circuit.

In various embodiments, the first active bridge circuit can comprise a first half-bridge circuit 370 and a second half-bridge circuit 375.

In various embodiments, the first half-bridge circuit 370 can comprise the first pair of switches 371, 372.

In various embodiments, the second half-bridge circuit 375 can comprise the second pair of switches 376, 377.

In various embodiments, the power converter 300 can comprise a third pair of switches 381, 382 of the multiple switches and a fourth pair of switches 386, 387 of the multiple switches. The third pair of switches 381, 382 and the fourth pair of switches 386, 387 can be connected in a second active bridge circuit.

In various embodiments, the second active bridge circuit can comprise a third half-bridge circuit 380 and a fourth half-bridge circuit 385.

In various embodiments, the third half-bridge circuit 380 can comprise the third pair of switches 381, 382.

In various embodiments, the fourth half-bridge circuit 385 can comprise the fourth pair of switches 386, 387.

In various embodiments, each switch of each pair of switches of the first pair of switches, of the second pair of switches, of the third pair of switches and of the fourth pair of switches works in a complementary mode of operation with the other switch in the pair of switches, i.e. when one switch is switched on, the other switch is switched off. The switches can be controlled by a control circuit such as a gate driver.

In various embodiments, one switch of the first pair of switches 371, 372 can be controlled by a first keying signal. The first keying signal can be a voltage signal. The switching on and off of a switch of the first pair of switches 371, 372 can be controlled by the first keying signal that is supplied to a control terminal of a switch of the first pair of switches 371, 372, for example to a gate terminal of a MOSFET switch. The other one switch of the first pair of switches 371, 372 can be controlled by a logically inverted first keying signal. For example, the switch 371 can be switched on while the switch 372 can be switched off, or the switch 372 can be switched on while the switch 371 can be switched off.

In various embodiments, a switch of the second pair of switches 376, 377 can be controlled by a second keying signal. The second keying signal can be a voltage signal. The switching on and off of the one switch of the second pair of switches 376, 377 can be controlled by the second keying signal that is supplied to a control terminal of the one switch of the first pair of switches 376, 377, for example a gate terminal of a MOSFET switch. The other one switch of the second pair of switches 376, 377 can be controlled by a logically inverted first keying signal. For example, the switch 376 can be switched on while the switch 377 can be switched off, or the switch 377 can be switched on while the switch 376 can be switched off.

In various embodiments, one switch of the third pair of switches 381, 382 can be controlled by a third keying signal. The third keying signal can be a voltage signal. The switching on and off of the one switch of the third pair of switches 381, 382 can be controlled by the third keying signal that is supplied to a control terminal of the one switch of the third pair of switches 381, 382, for example to a gate terminal of a MOSFET switch. The other one switch of the third pair of switches 381, 382 can be controlled by a logically inverted first keying signal. For example, the switch 381 can be switched on while the switch 382 can be switched off, or the switch 382 can be switched on while the switch 381 can be switched off.

In various embodiments, a switch of the fourth pair of switches 386, 387 can be controlled by a fourth keying signal. The fourth keying signal can be a voltage signal. The switching on and off of the one switch of the fourth pair of switches 386, 387 can be controlled by the fourth keying signal that is supplied to a control terminal of the one switch of the fourth pair of switches 386, 387, for example a gate terminal of a MOSFET switch. The other one switch of the fourth pair of switches 386, 387 can be controlled by a logically inverted first keying signal. For example, the switch 386 can be switched on while the switch 387 can be switched off, or the switch 387 can be switched on and the switch 386 can be switched off.

According to various embodiments, at least one (for example all) of the first keying signal, the second keying signal, the third keying signal and the fourth keying signal can be present in the form of a pulse wave, for example a rectangular wave.

In some embodiments, the power converter 300 can comprise a gate driver chip that can provide complementary signals with a dead time that can be referred to as the blanking time. The blanking time can be a time gap between the complementary signals. The time gap can be between 10 ms and 20 ms. The blanking time can amount to between 0 and 20% of the switching cycle time (Tsw). The blanking time can be relative to the switching frequency (freq_sw).

Alternatively, the keying signals can be the same, but the MOSFET switches can be complementary. For example, one switch of each pair of switches can be a p-switch, while another switch of each pair of switches can be an n-switch.

In various embodiments, each of the keying signals can if necessary be inverted and/or adapted in terms of level, for example depending on the characteristics of the transistor which is to be operated by a keying signal.

In various embodiments, the control unit (not illustrated) of the power converter 300 can be designed to control the first pair of switches 371, 372 and/or the second pair of switches 376, 377 and/or the third pair of switches 381, 382 and/or the fourth pair of switches 386, 387 in such a way that switching losses are reduced. For example the control unit can be designed to control all of the first pair of switches 371, 372, the second pair of switches 376, 377, the third pair of switches 381, 382 and the fourth pair of switches 386, 387. The control unit can reduce the "switching losses" down to zero, whereby zero-voltage switching (ZVS) is achieved.

In various embodiments, the control unit can be designed to shift the phase of the first keying signal and the second keying signal by a first time interval. To achieve a maximum current through the primary side of the AC grid 320, the phase shift between the first keying signal and the second keying signal can be 90 degrees. If, for example, the switch 371 is switched on, the switch 376 can be switched off. This can lead to a maximum current that flows to the primary side of the AC grid 320.

In various embodiments, the control unit can also be designed to shift the phase of the third keying signal and the fourth keying signal by a second time interval.

In various embodiments, the control unit can also be designed to shift the phase of the first keying signal and the third keying signal by a third time interval.

In various embodiments, the control unit can also be designed to shift the phase of the second keying signal and the fourth keying signal by a fourth time interval.

In various embodiments, the duration of one or more of the first time interval, the second time interval and the third time interval can be related to a degree of the phase shift. In various embodiments, the phase shift can lie between 0 degrees and 180 degrees. The phase between two signals can be determined by the difference between the front edges or the rear edges of the signals. The absolute time interval (e.g. in milliseconds) of one or more of the first time interval, the second time interval and the third time interval can be determined by making use of the switching frequency (freq_sw). For example, the absolute time interval can be calculated through (phase shift/360)*(1/freq_sw).

The range for the first phase shift (alpha) between the first keying signal and the second keying signal can lie between 0 and 180 degrees, wherein, if the first phase shift is 0 degrees, a zero voltage can be present across the primary winding and wherein, if the first phase shift is 180 degrees, a maximum voltage can be present across the primary winding. The first time interval, if the first phase shift between the first keying signal and the second keying signal is 180 degrees, can be 0.5*(1/freq_sw).

The range for the second phase shift (beta) between the third keying signal and the fourth keying signal can lie between 0 and 180 degrees, wherein, if the second phase shift is 0 degrees, a zero voltage can be present across the secondary winding and wherein, if the second phase shift is 180 degrees, a maximum voltage can be present across the secondary winding. The second time interval, if the second phase shift between the third keying signal and the fourth keying signal is 180 degrees, can be 0.5*(1/freq_sw).

The range for the third phase shift (delta) between the first keying signal and the third keying signal can lie between −90 and 90 degrees, wherein, if the third phase shift between the first keying signal and the third keying signal is −90 degrees, a maximum power transfer in the negative direction can be present, wherein, if the third phase shift between the first keying signal and the third keying signal is 0 degrees, a zero power transfer between the primary winding and the secondary winding can be present and wherein, if the third phase shift between the first keying signal and the third keying signal is 90 degrees, a maximum power transfer in the positive direction can be present. The third time interval, if the third phase shift between the first keying signal and the third keying signal is 90 degrees, can be 0.25*(1/freq_sw). In some embodiments, if the third phase shift is 0 degrees, a minimum power transfer between the primary winding and the secondary winding can be present, if the primary winding voltage and the reflected secondary winding voltage (secondary*winding ratio) are not the same. If, for example, the primary winding voltage is 10 V AC, and the reflected secondary winding voltage is 9 V AC, current can flow. The current can be (10-9)/(impedance_of_the_AC_grid).

In various embodiments, the power converter 300 can comprise a database. The database can be a lookup table. In various embodiments, the database can comprise data that take the input voltage, output voltage and the desired power of the power converter 300 into consideration. In some embodiments, the lookup table can be a three-dimensional table. In some embodiments, the lookup table can comprise three entries. The three entries can be an input voltage, an output voltage and a desired power or a desired current. For example, the input voltage can be 350 V, the output voltage 30 V, and the desired current 20 A. In some embodiments, the lookup table can comprise three outputs. The three outputs can be the first phase shift, the second phase shift and the third phase shift. The first phase shift can be a value between 0 and 180 degrees. The second phase shift can be a value between 0 and 180 degrees. The third phase shift can be a value between −90 and 90 degrees. In some embodiments, the first phase shift, the second phase shift and the third phase shift can be transferred in absolute time. In some embodiments, the database can comprise pre-calculated output values. In some embodiments, known input values operated with ZVS can be filled with corresponding output values. In some embodiments, known input values not operated with ZVS can be filtered out, or they can be set to zero for all three output values. For example, in the case of an overcurrent with an input voltage of 350 V, an output voltage of 30 V and a desired current of 35 A (which exceeds the table limit by 5 A) the first phase shift, the second phase shift and the third phase shift can be zero, which can cause the power converter to stop the transfer of power.

In various embodiments, the database can be a lookup table. The lookup table can be an indexed arrangement. The lookup table can be arranged as key-value pairs, wherein the keys are the sought-after data elements (looked up), and the values are the data output of the lookup table. For example, the key can be the input parameter and/or the output parameter of the power converter, while the data output of the lookup table can be at least one of the first through to the fourth time interval of the phase shifts.

In various embodiments, the first time interval and/or the second time interval and/or the third time interval can be obtained from the data in the database using an input parameter or an output parameter.

In various embodiments, the determination of the first time interval and/or of the second time interval and/or of the third time interval using the database can comprise taking values of the impedance of the AC grid 320 into consideration.

In various embodiments, the input parameter can be an input voltage. In various embodiments, the input parameter can be an input current.

In various embodiments, the output parameter can be an output voltage. In various embodiments, the output parameter can be an output current.

In various embodiments, the first time interval and/or the second time interval and/or the third time interval can be set to zero if the input parameter or the output parameter exceeds a value of the data in the database. In various embodiments, the first time interval and/or the second time interval and/or the third time interval can be set to zero within a switching cycle time. If the time intervals are zero, the phase shift between the keying signals is 0 degrees. If, for example, the first time interval is zero, the phase shift between the first keying signal and the second keying signal is zero. This can have the result that no current flows into the AC grid 320, which can protect the power converter 300 during events such as an undervoltage, an overvoltage or an overcurrent.

In various embodiments, if the first phase shift is 0 degrees, a voltage of 0 V can result from the primary winding, although the switches are still switched on and off at the switching frequency. In various embodiments, if the second phase shift is 0 degrees, a voltage of 0 V can result from the secondary winding, although the switches are still switched on and off at the switching frequency. In some embodiments, if the first phase shift and the second phase shift are 0 degrees, the current flowing through the power converter is I=(0 V AC−0 V AC)/AC_impedance, which is 0 A. In some embodiments, the third phase shift can be set to 0 degrees in order to prevent a further transfer of power.

In various embodiments, the description of the power converter 100 and/or of the power converter 200 also applies to the power converter 300.

Figure 4:
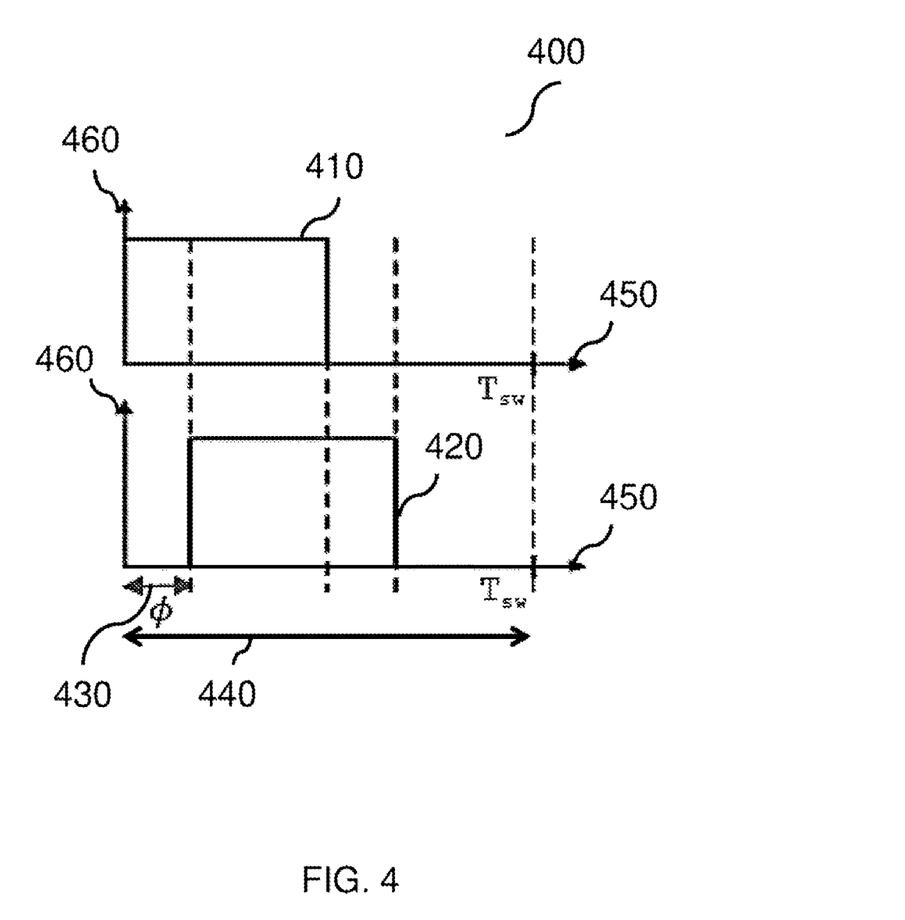
FIG. 4 illustrates a diagram 400 of a first keying signal 410 and of a second keying signal 420 with a phase shift 430 according to various embodiments.

FIG. 4 illustrates a diagram 400 of the first keying signal 410 and of the second keying signal 420 with a phase shift 430 according to various embodiments.

As shown in the diagram 400, a pair of phase-shifted periodic keying signals 410, 420 is illustrated for a switching cycle time Tsw, wherein the horizontal axis 450 represents the time and the vertical axis 460 represents the voltage. The first keying signal 410 for a first switch and the second keying signal 420 for a second switch are phase-shifted through the time interval 440.

In various embodiments, the power converter can be used with the general power supply. In various embodiments, the power converter can be used in an electric or for an electric transport apparatus, for example an E-scooter charging device. In various embodiments, the power converter can be used in a motor vehicle DC/DC converter. In various embodiments, the power converter can be used in a charging device for an electric vehicle (EV). In various embodiments, the DC/DC converter can be used in photovoltaic (PV) systems, for example in PV domestic storage systems. In various embodiments, the power converter can be used in any suitable apparatus that uses a PSFB or a DAB.

In various embodiments, the power converter can comprise a protection system that is able to react within a switching cycle time. In various embodiments, the power converter can have the advantage that it exhibits no control delay, since a control loop is not used. In various embodiments, there can be a control loop, but the use or meaning can be insignificant. For example, the control loop can be used to set the resistance or temperature dependency of some components. The database can manage 98-99% of the power transfer, while the remaining 1-2% can be managed by the control loop. The control delay can thus be insignificant.

In various embodiments, the power converter can have the advantage that it protects itself without any additional circuits or with a reduced quantity of additional circuits.

The invention claimed is:

1. A power converter that is designed to receive an input voltage and to output an output voltage, wherein the power converter comprises:
multiple switches;
a primary converter that is configured to receive the input voltage from a power source, the primary converter including a first pair of switches of the multiple switches and a second pair of switches of the multiple switches that are connected in a first bridge circuit;
an alternating current (AC) grid that is coupled electrically to the primary converter;
a secondary converter that is electrically coupled to the AC grid and that is configured to output output voltage, the secondary converter including a third pair of switches of the multiple switches and a fourth pair of switches of the multiple switches that are connected in a second bridge circuit; and
a control unit that is connected to the multiple switches, wherein the control unit is configured to control the multiple switches of the power converter based on data in a database, using an input parameter or an output parameter,
wherein the first pair of switches is controlled by a first keying signal, the second pair of switches is controlled by a second keying signal, the third pair of switches is controlled by a third keying signal and the fourth pair of switches is controlled by a fourth keying signal,
wherein the control unit is configured to shift the phase of the first keying signal and the second keying signal through a first time interval, to shift the phase of the third keying signal and the fourth keying signal through a second time interval, and to shift the phase of the first keying signal and the third keying signal by a third time interval,
wherein the first time interval, the second time interval and the third time interval are obtained from the data in the database using the input parameter or the output parameter, and
wherein the first time interval, the second time interval, and the third time interval are set to zero if the input parameter or the output parameter exceeds a value of the data in the database.

2. The power converter as claimed in claim 1, wherein the first bridge circuit comprises a first half-bridge circuit and a second half-bridge circuit, wherein the first half-bridge circuit comprises the first pair of switches and the second half-bridge circuit comprises the second pair of switches; and
wherein the second bridge circuit comprises a third half-bridge circuit and a fourth half-bridge circuit, wherein the third half-bridge circuit comprises the third pair of switches and the fourth half-bridge circuit comprises the fourth pair of switches.

3. The power converter as claimed in claim 1, wherein the control unit is configured to control the multiple switches in such a way that in each pair of switches of the first pair of switches, the second pair of switches, the third pair of switches and the fourth pair of switches, one switch is on and the other switch is off.

4. The power converter as claimed in claim 1, wherein the first time interval, the second time interval and the third time interval are set to zero within a switching time period.

5. The power converter as claimed in claim 1, wherein the database is a lookup table, and wherein the input parameter and/or the output parameter is an entry in the lookup table, and an output of the lookup table is at least one of the first time interval, the second time interval and the third time interval.

6. The power converter as claimed in claim 1, wherein the input parameter is the input voltage and the output parameter is the output voltage.

7. A method for operating a power converter including multiple switches, a primary converter that is configured to receive the input voltage from a power source, the primary converter including a first pair of switches of the multiple switches and a second pair of switches of the multiple switches that are connected in a first bridge circuit, an alternating current (AC) grid that is coupled electrically to the primary converter, a secondary converter that is electrically coupled to the AC grid and that is configured to output an output voltage, the secondary converter including a third pair of switches of the multiple switches and a fourth pair of switches of the multiple switches that are connected in a second bridge circuit, the method comprising:
controlling the of multiple switches of the power converter using a control unit that is connected to the multiple switches based on data in a database using the input parameter or an output parameter,
wherein the first pair of switches is controlled by a first keying signal, the second pair of switches is controlled by a second keying signal, the third pair of switches is controlled by a third keying signal and the fourth pair of switches is controlled by a fourth keying signal,
wherein the method further includes shifting the phase of the first keying signal and the second keying signal through a first time interval, shifting the phase of the third keying signal and the fourth keying signal through a second time interval, and shifting the phase of the first keying signal and the third keying signal by a third time interval, wherein the first time interval, the second time interval and the third time interval are obtained from the data in the database using the input parameter or the output parameter, and wherein the first time interval, the second time interval, and the third time interval are set to zero if the input parameter or the output parameter exceeds a value of the data in the database.

* * * * *